US012033785B2

(12) United States Patent
Kondo et al.

(10) Patent No.: US 12,033,785 B2
(45) Date of Patent: Jul. 9, 2024

(54) COIL COMPONENT

(71) Applicant: Murata Manufacturing Co., Ltd., Kyoto-fu (JP)

(72) Inventors: Kenta Kondo, Nagaokakyo (JP); Hiroyuki Honda, Nagaokakyo (JP); Hiroshi Marusawa, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 538 days.

(21) Appl. No.: 17/472,301

(22) Filed: Sep. 10, 2021

(65) Prior Publication Data

US 2022/0108832 A1 Apr. 7, 2022

(30) Foreign Application Priority Data

Oct. 6, 2020 (JP) ................................ 2020-169213

(51) Int. Cl.
*H01F 17/04* (2006.01)
*H01F 3/10* (2006.01)
*H01F 3/14* (2006.01)
*H01F 27/255* (2006.01)
*H01F 27/28* (2006.01)
*H01F 27/29* (2006.01)

(52) U.S. Cl.
CPC ........... *H01F 27/2823* (2013.01); *H01F 3/10* (2013.01); *H01F 3/14* (2013.01); *H01F 17/045* (2013.01); *H01F 27/255* (2013.01); *H01F 27/29* (2013.01)

(58) Field of Classification Search
CPC .... H01F 27/2823; H01F 17/045; H01F 27/29; H01F 17/04; H01F 27/24; H01F 3/10; H01F 3/14; H01F 27/255
USPC .................................................. 336/83, 192
See application file for complete search history.

(56) References Cited

U.S. PATENT DOCUMENTS 8,860,546 B2 * 10/2014 Lee .................... H01F 27/2828 336/212
2017/0229228 A1 * 8/2017 Kawasaki ................. H01F 3/10
2018/0130593 A1 * 5/2018 Sukegawa ............. H01F 27/255
2019/0189331 A1 * 6/2019 Kawasaki ................. H01F 5/00
2019/0333675 A1 * 10/2019 Fujita .................. H01F 41/0233
(Continued)

FOREIGN PATENT DOCUMENTS

DE 10 2018 215 946 A1 3/2019
DE 10 2018 217 879 A1 5/2019
JP H06-215927 A 8/1994
(Continued)

*Primary Examiner* — Tszfung J Chan
(74) *Attorney, Agent, or Firm* — Studebaker & Brackett PC

(57) ABSTRACT

A coil component includes a core having a winding core portion, a first flange portion disposed on a first end portion of the winding core portion, and a second flange portion disposed on a second end portion of the winding core portion; a wire winding on the winding core portion of the core; and a plate member disposed so as to bridge the first flange portion and the second flange portion. The coil component further includes an adhesive portion disposed between the first flange portion and the plate member and adhering the first flange portion to the plate member, and an adhesive portion disposed between the second flange portion and the plate member and adhering the second flange portion to the plate member. The adhesive portion contains a resin and magnetic powder.

20 Claims, 5 Drawing Sheets

(56) References Cited

U.S. PATENT DOCUMENTS

| | | | | |
|---|---|---|---|---|
| 2020/0105451 | A1* | 4/2020 | Horie | H01F 27/266 |
| 2020/0265985 | A1* | 8/2020 | Miyamoto | H01F 17/045 |

FOREIGN PATENT DOCUMENTS

| | | | | |
|---|---|---|---|---|
| JP | 2006-237249 | A | | 9/2006 |
| JP | 2014099587 | A | * | 5/2014 |
| JP | 2015-065272 | A | | 4/2015 |
| JP | 2019-096653 | A | | 6/2019 |
| JP | 2019-135763 | A | | 8/2019 |
| JP | 2019-201155 | A | | 11/2019 |

* cited by examiner

COIL COMPONENT

CROSS-REFERENCE TO RELATED APPLICATION

This application claims benefit of priority to Japanese Patent Application No. 2020-169213 filed Oct. 6, 2020, the entire content of which is incorporated herein by reference.

BACKGROUND

Technical Field

The present disclosure relates to a coil component.

Background Art

There is a known coil component described in Japanese Unexamined Patent Application Publication No. 2015-65272. This coil component includes a core, a plate member, and a wire winding on the core, and an adhesive is disposed between the wire and the plate member to fix the core to the plate member.

SUMMARY

However, when an adhesive is disposed on a wire as described in Japanese Unexamined Patent Application Publication No. 2015-65272, an adhesive area cannot be reserved, thus having sometimes lowered fixation between a core and a plate member.

Accordingly, the present disclosure provides a coil component that has increased fixation between a core and a plate member, low magnetic resistance, and good product characteristics.

A coil component according to preferred embodiments of the present disclosure includes a core having a winding core portion, a first flange portion disposed on a first end portion of the winding core portion, and a second flange portion disposed on a second end portion of the winding core portion; and a wire winding on the winding core portion of the core; a plate member disposed so as to bridge the first flange portion and the second flange portion. The coil component further includes an adhesive portion disposed between the first flange portion and the plate member and adhering the first flange portion to the plate member, and an adhesive portion disposed between the second flange portion and the plate member and adhering the second flange portion to the plate member. The adhesive portion contains a resin and magnetic powder. The magnetic powder includes first particles having a particle size in the range of 0.1 μm or more to 2.0 μm or less (i.e., from 0.1 μm to 2.0 μm), and second particles having a particle size in the range of 3.0 μm or more to 8.0 μm or less (i.e., from 3.0 μm to 8.0 μm). The proportion of the particle count of the first particles relative to the total particle count of the magnetic powder is in the range of 0.11 or more to 0.80 or less (i.e., from 0.11 to 0.80). The proportion of the particle count of the second particles relative to the total particle count of the magnetic powder is in the range of 0.19 or more to 0.89 or less (i.e., from 0.19 to 0.89). The proportion of the sum of the particle count of the first particles and the particle count of the second particles relative to the total particle count of the magnetic powder is 0.84 or more. In a section of the adhesive portion, the proportion of the area of the magnetic powder relative to the area of the adhesive portion is 25.0% or more.

According to the embodiment described above, adhesion is made between a first flange portion and a plate member and between a second flange portion and the plate member in an adhesive portion, thus enabling reserving an adhesive area. The adhesive portion contains magnetic powder that meets the conditions described above, thereby enabling reducing magnetic resistance of a coil component, and furthermore, enabling reserving adhesiveness. This allows improved fixation and improved product characteristics.

Moreover, in one embodiment of the coil component, magnetic permeability μ' of the adhesive portion at 1 MHz is 4.6 or more.

According to the embodiment described above, it is possible to lower magnetic resistance of a coil component and to improve product characteristics.

Moreover, in one embodiment of the coil component, the proportion of the area of the magnetic powder is 35.1% or more.

According to the embodiment described above, it is possible to increase the proportion of the area of magnetic powder in an adhesive portion and to lower further magnetic resistance.

Moreover, in one embodiment of the coil component, the proportion of the sum of the particle count of the first particles and the particle count of the second particles is 0.90 or more.

According to the embodiment described above, it is possible to reserve adherence of a core to a plate member, as well as to lower magnetic resistance of a coil component and to improve product characteristics.

Moreover, in one embodiment of the coil component, a first part having a narrow spacing and a second part having a wider spacing than the first part are present in at least one of a spacing between the first flange portion and the plate member and a spacing between the second flange portion and the plate member.

Here, the first part is a part that includes a minimal spacing, and the second part is a part that includes a maximal spacing.

According to the embodiment described above, placement of the first part enables lowering magnetic resistance of a coil component, and placement of the second part enables enhancing adhesiveness of a core to a plate member.

Moreover, in one embodiment of the coil component, the spacing in the first part is in the range of 1 μm or more to 10 μm or less (i.e., from 1 μm to 10 μm), and the spacing in the second part is in the range of 5 μm or more to 20 μm or less (i.e., from 5 μm to 20 μm).

According to the embodiment described above, it is possible to lower further magnetic resistance of a coil component and to enhance further adhesiveness of a core to a plate member.

Moreover, in one embodiment of the coil component, the first particles are present in the first part in an amount greater than in the second part.

According to the embodiment described above, it is possible to make magnetic powder appropriately present in the first part.

Moreover, in one embodiment of the coil component, the second particles are present in the second part in an amount greater than in the first part.

According to the embodiment described above, it is possible to make magnetic powder appropriately present in the second part.

Moreover, in one embodiment of the coil component, the first part is present closer to the winding core portion.

According to the embodiment described above, the length of a magnetic path is shortened, thus allowing an inductance value to be larger.

According to a coil component of the present disclosure, it is possible to increase fixation between a core and a plate member, as well as to reduce magnetic resistance and to make product characteristics good.

Other features, elements, characteristics and advantages of the present disclosure will become more apparent from the following detailed description of preferred embodiments of the present disclosure with reference to the attached drawings.

DETAILED DESCRIPTION

A coil component that is one aspect of the present disclosure will now be described in detail with reference to embodiments depicted. Here, the drawings partially include a schematic one, and may not reflect an actual dimension or ratio.

First Embodiment

Figure 1:
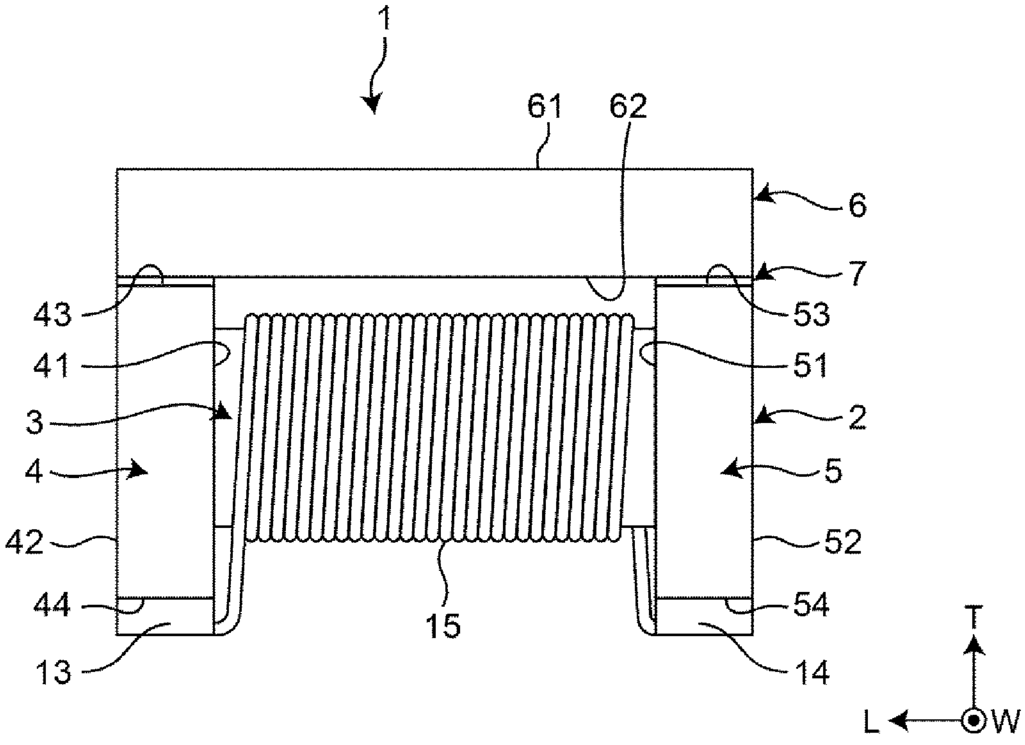
FIG. 1 is a front view showing a coil component according to a first embodiment of the present disclosure.
Figure 2:
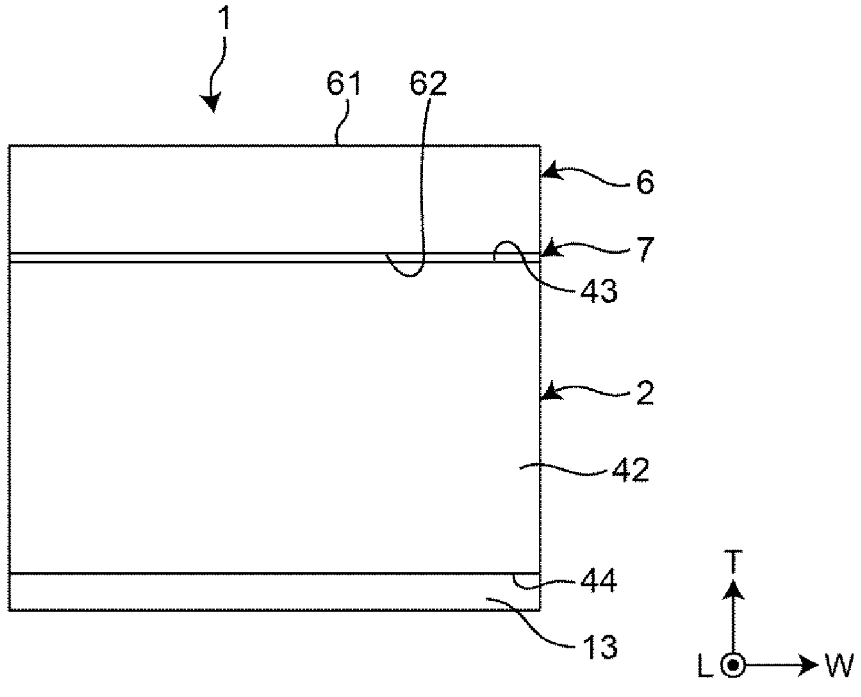
FIG. 2 is a side view of the coil component in FIG. 1.

FIG. 1 is a front view showing a coil component 1 according to a first embodiment of the present disclosure, and FIG. 2 is a side view in which the coil component 1 is seen in a direction toward a first flange portion.

As shown in FIGS. 1 and 2, the coil component 1 has a core 2, a plate member 6, and an adhesive portion 7 which adheres the core 2 to the plate member 6.

The core 2 has a winding core portion 3, a first flange portion 4 which is disposed on a first end portion of the winding core portion 3, and a second flange portion 5 which is disposed on a second end portion of the winding core portion 3. The core 2 is formed of a magnetic substance such as ferrite, for example.

The first flange portion 4 has an inner face 41 which faces the winding core portion 3, an outer face 42 which faces the opposite side to the inner face 41, an upper face 43 which connects the inner face 41 to the outer face 42, and a lower face 44 which faces the opposite side to the upper face 43. Here, the upper face 43 is a face that faces the plate member 6.

The second flange portion 5 has an inner face 51 which faces the winding core portion 3, an outer face 52 which faces the opposite side to the inner face 51, an upper face 53 which connects the inner face 51 to the outer face 52, and a lower face 54 which faces the opposite side to the upper face 53. Here, the upper face 53 is a face that faces the plate member 6.

A first terminal electrode 13 is disposed onto the lower face 44 of the first flange portion 4, and a second terminal electrode 14 is disposed onto the lower face 54 of the second flange portion 5. The first terminal electrode 13 and the second terminal electrode 14 are formed by, for example, printing with an electrically-conductive paste containing electrically-conductive metal powder such as Ag powder, then baking this, and further applying Ni plating and Sn plating. Alternatively, the terminal electrodes 13 and 14 may be formed by, for example, attaching an electrically-conductive metal piece formed of copper-based metal such as tough-pitch copper or phosphor bronze onto the first flange portion 4 and the second flange portion 5.

The winding core portion 3 has a central axis extending in the direction of connecting the first flange portion 4 to the second flange portion 5. On the winding core portion 3, wire 15 is wound along the central axis of the winding core portion 3.

The wire 15 is formed of Cu wire insulatingly coated with a resin such as polyurethane, polyester-imide, and polyamide-imide, for example. One end of the wire 15 is electrically connected to the first terminal electrode 13, and likewise, the other end is electrically connected to the second terminal electrode 14. The connection of the first terminal electrode 13 and the second terminal electrode 14 to the wire 15 employs application of, for example, thermocompression bonding, ultrasonic welding, or laser welding.

Here, in the following, the lower face 44 of the first flange portion 4 is present on a side to be mounted on a mounting board. An axis direction of the winding core portion 3 is set to as an L direction, a direction perpendicular to the L direction in the lower face 44 of the first flange portion 4 is set to as a W direction, and a direction in which the lower face 44 and the upper face 43 of the first flange portion 4 face each other is set to as a T direction. The T direction is perpendicular to the L direction and the W direction. The positive direction of the T direction is set to as an upward direction, and the negative direction of the T direction is set to as a downward direction. That is, the lower face 44 of the first flange portion 4 corresponds to a downward vertical direction, and the upper face 43 of the first flange portion 4 corresponds to an upward vertical direction. The L direction is also referred to as a length direction of the core 2, the W direction is also referred to as a width direction of the core 2, and the T direction is also referred to as a height direction of the core 2.

The plate member 6 is disposed so as to bridge the first flange portion 4 and the second flange portion 5. The plate member 6 has a first principal face 61 and a second principal face 62 which faces the opposite side to the first principal face 61. The plate member 6 is formed of a magnetic substance, such as ferrite, as similar to the core 2, and thereby, the plate member 6 configures a closed magnetic circuit in cooperation with the core 2.

The plate member 6 faces the upper face 43 of the first flange portion 4 and the upper face 53 of the second flange portion 5 of the core 2 on the second principal face 62.

The adhesive portion 7 is disposed between the first flange portion 4 of the core 2 and the plate member 6 to adhere the first flange portion 4 to the plate member 6, and is disposed between the second flange portion 5 and the plate member 6 to adhere the second flange portion 5 to the plate member 6. That is, the adhesive portions 7 are disposed between the upper face 43 of the first flange portion 4 and the second principal face 62 of the plate member 6, and between the upper face 53 of the second flange portion 5 and the second principal face 62 of the plate member 6. Adhesion is made between the first flange portion 4 and the plate member 6 and between the second flange portion 5 and the plate member 6, thus enabling reserving areas of adhering the core 2 to the plate member 6. The upper face of a flange portion has previously sometimes been subject to polishing and the like to contact a core with a plate member, but placement of the adhesive portion 7 in the present disclosure also allows omitting a step such as polishing.

Preferably, the adhesive portion 7 is not disposed between the winding core portion 3 of the core 2 and the plate member 6. Because of such a configuration, even when an external force is applied to the plate member 6, the external force is not to be transmitted directly to the wire 15 wound on the winding core portion 3, allowing deformation of the wire 15 to be suppressed, and enabling disconnection of the wire 15 to be suppressed.

The adhesive portion 7 contains a resin and magnetic powder.

The resin adheres the first flange portion 4 to the plate member 6, and the second flange portion 5 to the plate member 6.

As the resin, a curable resin, a plastic resin, rubber, an elastomer, or the like can be used. In view of thermal resistance, the resin is preferably a curable resin such as a thermosetting resin or an ultraviolet-curable resin, and may be, for example, an epoxy-based resin, a silicone-based resin, a phenol-based resin, and a melamine-based resin.

For example, when the resin is an epoxy-based resin, a bis-F-type epoxy resin, a bis-A-type epoxy resin, a phenoxy-type epoxy resin, or the like can be used as a material to form the resin, and an amine-based curative such as dicyandiamide, an acid anhydride-based curative, or the like can be exemplified as a curative. The epoxy resin and the curative can be used as any combination selected from these epoxy resins and curatives. Furthermore, an additive listed below may be added: a dispersant, for example, a polycarboxylic acid-based dispersant; and a silane coupling agent, for example, a silane coupling agent having an epoxy group, and a silane coupling agent having various functional groups such as a methyl group, a phenyl group, a vinyl group, an amino group, or an isocyanate group.

The magnetic powder is present as dispersed in the resin. As the magnetic powder, magnetic metal, magnetic oxide, or the like can be used. In view of an environment of use, the magnetic powder is preferably metal or oxide having a ferromagnetic property in ordinary temperature, and may be, for example, nickel powder, cobalt powder, iron powder, amorphous iron powder, iron-silicon alloy-based powder, and ferrite (such as iron-nickel-based ferrite powder or iron-zinc-based ferrite powder). The magnetic powder may be a mixture of magnetic powder having the same composition or different compositions.

In view of densely filling the magnetic powder in the adhesive portion 7 and exhibiting further a characteristics-improving effect of the coil component 1, powder easily controllable in particle size distribution is preferable, and thus metal magnetic powder manufactured by liquid-phase reduction or atomization is preferable.

The magnetic powder includes first particles having a particle size in the range of about 0.1 μm or more to about 2.0 μm or less (i.e., from about 0.1 μm to about 2.0 μm), and second particles having a particle size in the range of about 3.0 μm or more to about 8.0 μm or less (i.e., from about 3.0 μm to about 8.0 μm). In the adhesive portion 7, the proportion of the particle count of the first particles relative to the total particle count of the magnetic powder is in the range of about 0.11 or more to about 0.80 or less (i.e., from about 0.11 to about 0.80), the proportion of the particle count of the second particles relative to the total particle count of the magnetic powder is in the range of about 0.19 or more to about 0.89 or less (i.e., from about 0.19 to about 0.89), the proportion of the sum of the particle count of the first particles and the particle count of the second particles relative to the total particle count of the magnetic powder is about 0.84 or more, and the proportion of the area of the magnetic powder relative to the area of the adhesive portion 7 (sometimes referred to as filling factor) is about 25.0% or more in a section of the adhesive portion 7. Here, the proportion of the particle count of the first particles relative to the total particle count of the magnetic powder may be referred to as particle count of the first particles/total particle count; the proportion of the particle count of the second particles relative to the total particle count of the magnetic powder may be referred to as particle count of the second particles/total particle count; and the proportion of the sum of the particle count of the first particles and the particle count of the second particles relative to the total particle count of the magnetic powder may be referred to as (particle count of the first particles+particle count of the second particles)/total particle count.

Containing magnetic powder so as to meet the conditions described above enables reducing magnetic resistance of the coil component 1, raising an impedance value, and further reserving adhesiveness. This allows improved fixation and improved product characteristics.

The measurement described above will be now described.

Figure 3:
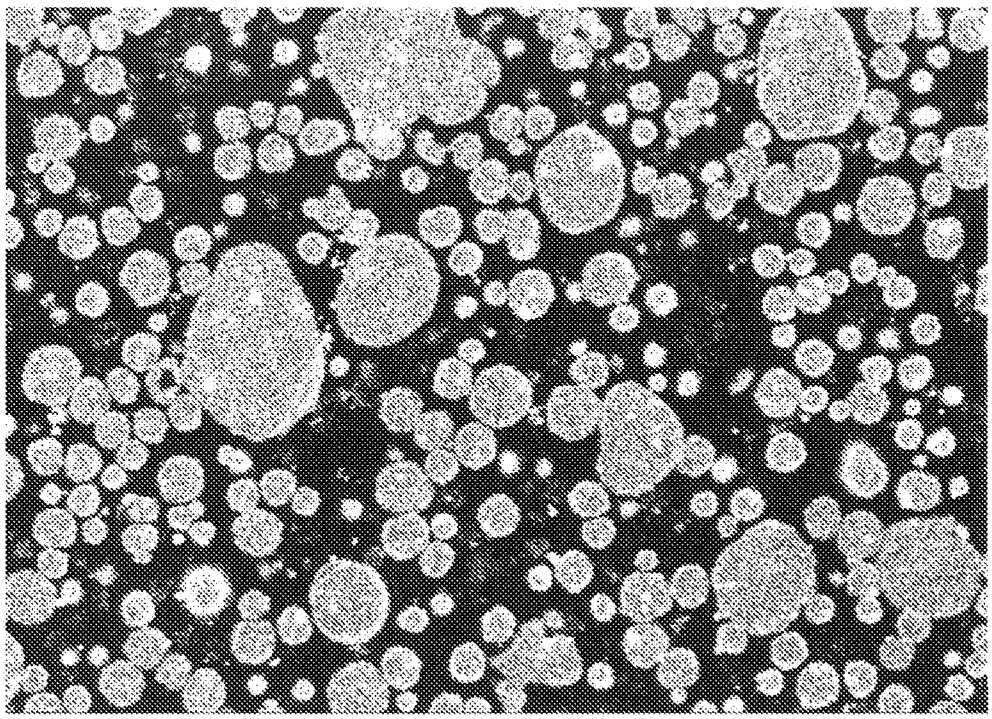
FIG. 3 is an image obtained by a scanning electron microscope (SEM) showing a sectional condition of an adhesive portion.

For particle size distribution of the magnetic powder, a section of the adhesive portion 7 is subjected to SEM observation for 20 visual fields with a magnification of 5000 times and 5 kV, measurement is performed for the diameter of the magnetic powder in the visual fields, and the count is aggregated. An example of images is shown in FIG. 3. The data thus obtained is calculated by creating a histogram of the count relative to a particle size (equivalent circle diameter). Data of the total particle count and counts of the first particles and the second particles thus aggregated are extracted from the particle size distribution thus obtained, and values are derived for particle count of the first particles/total particle count, particle count of the second particles/total particle count, and (particle count of the first particles+particle count of the second particles)/total particle count.

Filling factor is set to as a value figured out by performing mapping observation of a section of the adhesive portion 7 using scanning electron microscopy/energy dispersive X-ray spectroscopy (SEM-EDX) with a magnification of 5000 times, and calculating the proportion of a sectional area of the magnetic powder constituent by binarization processing.

The particle size distribution may have only a single peak, or may have a plurality of peaks.

Magnetic permeability μ' of the adhesive portion 7 at 1 MHz is, for example, about 4.6 or more, preferably about 5.0 or more. Having such magnetic permeability μ' enables lowering magnetic resistance of the coil component 1 and improving product characteristics. The upper limit value of magnetic permeability μ' is not particularly limited and is for example, about 20.0.

Preferably, filling factor is about 35.1% or more. The filling factor with the value as described above leads to increase in the proportion of the area of the magnetic powder in the adhesive portion 7, enabling magnetic resistance to be more lowered.

The filling factor described above is, for example, about 80% or less, specifically about 50% or less. Having such filling factor allows the adhesive portion 7 to be easily formed. For example, when the adhesive portion 7 is disposed by applying an uncured adhesive portion as mentioned later, application of the composition can be performed well.

Preferably, the proportion of the sum of the particle count of the first particles and the particle count of the second particles relative to the total particle count of the magnetic powder is about 0.90 or more. Inclusion of the first particles and the second particles in such proportions enables reserving adherence of the core to the plate member, as well as lowering magnetic resistance of the coil component and improving product characteristics. The upper limit value of the proportion of the sum of the particle count of the first particles and the particle count of the second particles relative to the total particle count of the magnetic powder is, for example, about less than 1.0.

The proportion of the particle count of the first particles relative to the particle count of the second particles (that is, particle count of the first particles/particle count of the second particles) may be in the range of, for example, about 0.10 or more to about 10.0 or less (i.e., from about 0.10 to about 10.0), and is preferably about 0.10 or more to about 5.0 or less (i.e., from about 0.10 to about 5.0) in the range described above. Presence of the first particles and the second particles in the proportion described above allows filling factor to have a good value, enables reducing magnetic resistance of the coil component, and allows contributing to improvement of a physical property of a product. In addition, too much of the proportion described above may cause spreadability to be higher, and too little of the proportion described above may cause filling factor to be lower and affect magnetic permeability.

EXAMPLES

Examples of the present disclosure will be described below, but the present disclosure is not limited to the following description.

Examples 1 to 7 and Comparative Examples 8 to 13

<Creation of an Adhesive Portion>

Adhesives were created by using nickel powder as magnetic powder, a bis-F-type epoxy resin as a polymer material, dicyandiamide as a curative, polycarboxylic acid-based dispersant as an additive, and a silane coupling agent having an epoxy group, and mixing these materials so as to provide a dispersion state with uniformity. Cured materials having compositions as shown in Table 1 were made from the adhesives thus made. These cured materials correspond to an adhesive portion. Here, samples Nos. 1 to 7 correspond to Examples 1 to 7, samples Nos. 8 to 12 correspond to Comparative Examples 8 to 12, respectively. Details of the nickel powder used are as follows.

Samples Nos. 1, 3, 5 to 7, and 11: the following two types of nickel powder were employed:

- nickel powder in which a peak of particle size distribution is in the range of 0.1 μm or more to 2.0 μm or less (i.e., from 0.1 μm to 2.0 μm), and
- nickel powder in which a peak of particle size distribution is in the range of 3.0 μm or more to 8.0 μm or less (i.e., from 3.0 μm to 8.0 μm).

Sample No. 2: the following two types of nickel powder were employed:

- nickel powder in which a peak of particle size distribution is in the range of more than 2.0 μm to less than 3.0 μm (i.e., from 2.0 μm to 3.0 μm), and
- nickel powder in which a peak of particle size distribution is in the range of 3.0 μm or more to 8.0 μm or less (i.e., from 3.0 μm to 8.0 μm).

Samples Nos. 4 and 9: the following one type of nickel powder was employed:

- nickel powder in which a peak of particle size distribution is in the range of 3.0 μm or more to 8.0 μm or less (i.e., from 3.0 μm to 8.0 μm).

Sample No. 8: the following one type of nickel powder was employed:

- nickel powder in which a peak of particle size distribution is in the range of 0.1 μm or more to 2.0 μm or less (i.e., from 0.1 μm to 2.0 μm).

Sample No. 10: the following two types of nickel powder were employed:

- nickel powder in which a peak of particle size distribution is in the range of 0.1 μm or more to 2.0 μm or less (i.e., from 0.1 μm to 2.0 μm), and
- nickel powder in which a peak of particle size distribution is in the range of more than 9.0 μm to 11.0 μm or less (i.e., from 9.0 μm to 11.0 μm).

TABLE 1

| Sample No. | | 1 | 2 | 3 | 4 | 5 | 6 | 7 | 8 | 9 | 10 | 11 | 12 |
|---|---|---|---|---|---|---|---|---|---|---|---|---|---|
| Particle count of the first particles/total particle count | | 0.18 | 0.11 | 0.80 | 0.19 | 0.18 | 0.20 | 0.16 | 0.93 | 0.00 | 0.16 | 0.18 | — |
| Particle count of the second particles/total particle count | | 0.81 | 0.79 | 0.19 | 0.72 | 0.66 | 0.89 | 0.83 | 0.01 | 0.99 | 0.13 | 0.79 | — |
| (Particle count of the first particles + particle count of the second particles)/total particle count | | 0.99 | 0.90 | 0.99 | 0.91 | 0.84 | 0.98 | 0.96 | 0.94 | 0.99 | 0.29 | 0.79 | — |
| Particle count of the first particles/particle count of the second particles | | 0.22 | 0.14 | 4.15 | 0.27 | 0.27 | 0.22 | 0.19 | 151.00 | 0.00 | 1.23 | 0.23 | — |
| Characteristics of an uncured adhesive portion | Spreadability | ⊙ | ⊙ | ⊙ | ⊙ | ⊙ | ○ | ⊙ | X | ○ | ○ | ○ | ○ |
| Characteristics of an adhesive portion | Filling factor (%) | 40.2 | 37.6 | 41.7 | 39.0 | 35.1 | 56.2 | 25.0 | 24.5 | 22.3 | 32.9 | 12.2 | 0.0 |
| | Magnetic permeability | 7.2 | 5.5 | 7.3 | 5.6 | 4.8 | 9.5 | 4.6 | 4.1 | 3.9 | 4.0 | 1.9 | 1.0 |
| | Adhesiveness | ○ | ○ | ○ | ○ | ○ | ○ | ○ | ○ | ○ | X | ○ | ○ |
| Characteristics of products | Improvement of characteristics | ⊙ | ⊙ | ⊙ | ⊙ | ○ | ⊙ | ○ | X | X | X | X | X |
| | Lc value (nH) | 155 | 145 | 152 | 146 | 141 | 165 | 137 | 121 | 122 | 111 | 116 | 110 |

The evaluation method described in Table 1 will be shown below.

<Spreadability>

Spreadability of an uncured adhesive portion was evaluated by printing an uncured adhesive portion on a plate member using a screen printing plate having an opening with an area of the flange of the core. Evaluation criteria are as follows.

○: a condition without bleeding and blurring of printing x: presence of at least of one of bleeding and blurring of printing <Magnetic Permeability>

For magnetic permeability, an uncured adhesive portion was cured in a ring shape and subject to measurement at 1 MHz using an impedance analyzer.

<Adhesiveness>

Two alumina substrates were prepared. An uncured adhesive portion was applied on one alumina substrate, and the other alumina substrate was arranged and pressed thereon, followed by heating at 150° C. for 1 hour to make the adhesive portion cured. Then, a part extruded from the alumina substrates in pressing was removed, thereby forming 5 mm×5 mm of an adhesive portion. A tensile strength test was performed using the Autograph manufactured by Shimadzu Corporation. Evaluation criteria are as follows.

○: a rupture strength of an adhesive portion of 8 MPa or more x: a rupture strength of an adhesive portion of less than 8 MPa <Characteristics of Products>

⊙: The rate of Lc rise is 30% or more relative to sample No. 12 (Lc: 110), in which magnetic powder is not used.

○: The rate of Lc rise is 15% or more to less than 30% (i.e., from 15% to 30%) relative to sample No. 12 (Lc: 110), in which magnetic powder is not used.

x: The rate of Lc rise is less than 15% relative to sample No. 12 (Lc: 110), in which magnetic powder is not used.

<Lc Value>

Lc value was measured as follows. Impedance analyzer 4294A (Keysight Technologies) was used to measure Lc values at a measurement frequency of 100 kHz (n=30), and the average was set as an Lc value.

As shown in Examples 1 to 7, meeting particle count of the first particles/total particle count of 0.11 or more to 0.80 or less (i.e., from 0.11 to 0.80), particle count of the second particles/total particle count of 0.19 or more to 0.89 or less (i.e., from 0.19 to 0.89), and (particle count of the first particles+particle count of the second particles)/total particle count of 0.84 or more, as well as having a filling factor of 25% or more caused adhesiveness to be good and an inductance value of the coil component to be higher.

In Comparative Example 8, the particle count of the first particles was large, and consequently, the viscosity of an uncured adhesive portion was too high, and the spreadability deteriorated. Moreover, in Comparative Example 8, though a value of (particle count of the first particles+particle count of the second particles)/total particle count was 0.94, which was a high value, the first particles were present with remarkably high particle count. The value of filling factor thus failed to meet 25.0% or more, and consequently, the impedance value was not better. Furthermore, the value of magnetic permeability was also lowered.

In Comparative Example 9, the particle count of the second particles was large, and the value of filling factor failed to meet 25.0% or more in spite of the value of (particle count of the first particles+particle count of the second particles)/total particle count being 0.99, which was a high value. Consequently, the impedance value was also not better. Furthermore, the value of magnetic permeability was also lowered.

In Comparative Example 10, though the value of filling factor was good, particle count of the second particles/total particle count was small, and the value of (particle count of the first particles+particle count of the second particles)/total particle count was also low. Consequently, the impedance value was not better, and evaluation of adhesiveness was also negative (x). Furthermore, the value of magnetic permeability was also lowered.

In Comparative Example 11, particle count of the first particles/total particle count was 0.11 or more to 0.80 or less (i.e., from 0.11 to 0.80), and particle count of the second particles/total particle count was 0.19 or more to 0.89 or less (i.e., from 0.19 to 0.89). However, a value of (particle count of the first particles+particle count of the second particles)/total particle count was low, and the value of filling factor was also low. Consequently, the impedance value was not better. Moreover, magnetic permeability was also lowered.

In Comparative Example 12, no magnetic powder was contained, and magnetic resistance failed to be reduced, thus not improving product characteristics. Furthermore, the value of magnetic permeability was of course lowered.

That is, as shown in Comparative Examples 8 to 12, it was found that, only after all of particle count of the first particles/total particle count, particle count of the second particles/total particle count, (particle count of the first particles+particle count of the second particles)/total particle count, and filling factor have appropriate numerical values, it is possible to obtain good adhesiveness, and furthermore, to reduce magnetic resistance and to raise an impedance value.

Second Embodiment

Figure 4:
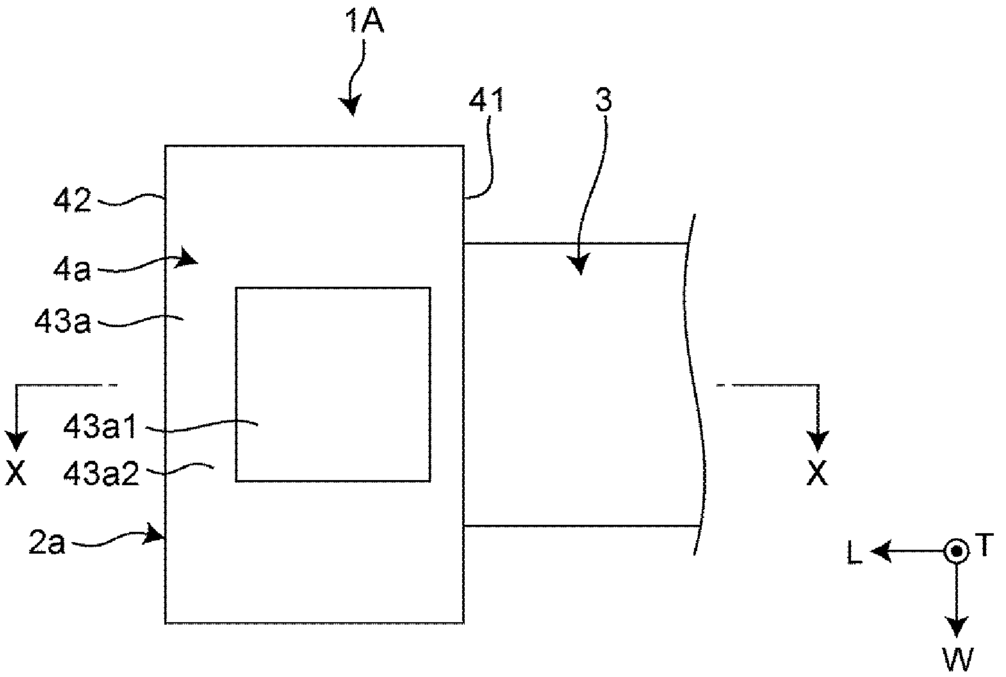
FIG. 4 is a plan view showing a coil component according to a second embodiment of the present disclosure.
Figure 5:
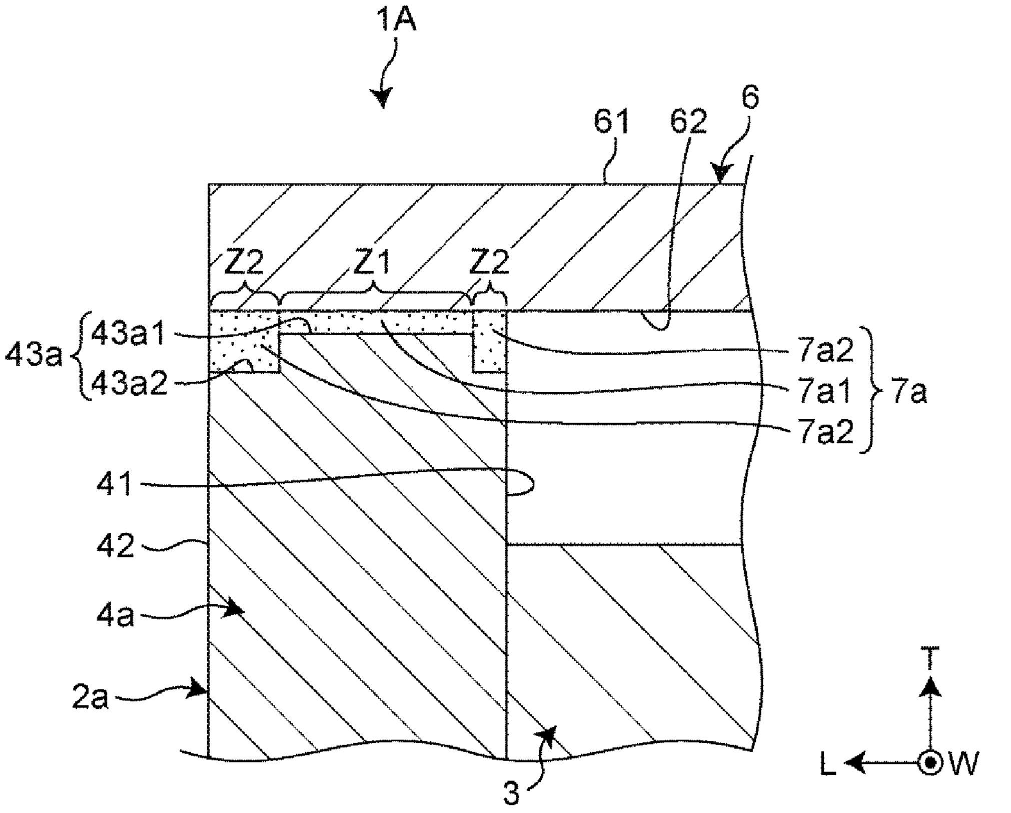
FIG. 5 is a sectional view showing the coil component according to the second embodiment of the present disclosure.

FIG. 4 is a plan view showing a coil component 1A according to a second embodiment, and is an illustration in which a first flange portion 4*a* of the coil component 1A is seen in the T direction. FIG. 5 is an X-X sectional view of FIG. 4, that is, a sectional view including the T direction and the L direction. Here, the plate member 6 and the wire 15 are omitted in FIG. 4, and the wire 15 is omitted in FIG. 5.

The coil component 1A is different from the coil component 1 according to the first embodiment in the shape of the upper face of a flange portion of a core. This point of difference will be described below. Other configurations are the same as those of the first embodiment, and the description may be omitted.

As shown in FIG. 4 and FIG. 5, in an upper face 43*a*, the first flange portion 4*a* of a core 2*a* of the coil component 1A has a flat part 43*a*2 and a protrusion 43*a*1 which is protruded toward the plate member 6 more closely than the flat part 43*a*2. Between the first flange portion 4*a* and the plate member 6, a spacing between the protrusion 43*a*1 and the second principal face 62 of the plate member 6 is narrower than a spacing between the flat part 43*a*2 and the second principal face 62 of the plate member 6. That is, a first part Z1 having a narrow spacing and a second part Z2 having a spacing wider than the first part Z1 are present in a spacing between the first flange portion 4*a* and the plate member 6. The first part Z1 corresponds to a part between the protrusion 43*a*1 and the second principal face 62 of the plate member 6, and the second part Z2 corresponds to a part between the flat part 43*a*2 and the second principal face 62 of the plate member 6.

In other words, an adhesive portion 7*a* has a first part 7*a*1 which has a thin thickness and a second part 7*a*2 which has a thickness larger than the first part 7*a*1. The first part 7*a*1 of the adhesive portion 7*a* is present in the first part Z1, and the second part 7*a*2 of the adhesive portion 7*a* is present in the second part Z2.

According to the embodiment, placement of the first part Z1 causes a distance between the first flange portion 4*a* and the plate member 6 to be closer, and enables lowering magnetic resistance of the coil component 1A. Placement of the second part Z2 causes a distance between the first flange portion 4*a* and the plate member 6 to be larger, enables increasing the amount of the adhesive portion 7*a*, and allows enhancing further adhesiveness between the core 2*a* and the plate member 6.

Preferably, a spacing in the first part Z1 is in the range of about 1 μm or more to about 10 μm or less (i.e., from about 1 μm to about 10 μm), and a spacing in a second part Z2 is in the range of about 5 μm or more to about 20 μm or less (i.e., from about 5 μm to about 20 μm). Presence of the spacings of the first part Z1 and the second part Z2 in the range described above enables lowering magnetic resistance of the coil component 1A, and enhancing further adhesiveness of the core 2*a* to the plate member 6.

Preferably, the first particles are present in the first part Z1 in an amount greater than in the second part Z2. This enables the magnetic powder to be appropriately present in the first part Z1.

Preferably, the second particles are present in the second part Z2 in an amount greater than in the first part Z1. This enables the magnetic powder to be appropriately present in the second part Z2.

For example, the biased distribution of the first particles and the second particles described above can be controlled and provided as follows. In a manufacturing stage, a paste containing the first particle and the second particle is applied on the upper face 43*a* of the first flange portion 4*a*, and inclined so as to let the second part Z2 be placed at a level lower than that of the first part Z1 in a vertical direction. Since the second particle is heavier than the first particle, the second particles flow to a lower level than the first particles, that is, toward the second part Z2, by gravity. In this way, the second particles can be biasedly distributed in the second part Z2, and the first particles can be biasedly distributed in the first part Z1.

Preferably, the first part Z1 is disposed so that the proportion of an area S1 of the protrusion 43*a*1 relative to the sum of the area S1 of the protrusion 43*a*1 and an area S2 of the flat part 43*a*2, that is, S1/(S1+S2) may be in the range of about 0.1 or more to about 0.9 or less (i.e., from about 0.1 to about 0.9). This enables better reducing magnetic resistance of the coil component 1A and better improving product characteristics, as well as improving further adhesiveness of the core 2*a* to the plate member 6.

The area S1 corresponds to an area of a region occupied by the first part Z1 as seen in the T direction. The area S2 corresponds to an area of a region occupied by the second part Z2 as seen in the T direction.

A second flange portion of the coil component 1A has a structure similar to that of the first flange portion 4*a*.

Third Embodiment

Figure 6:
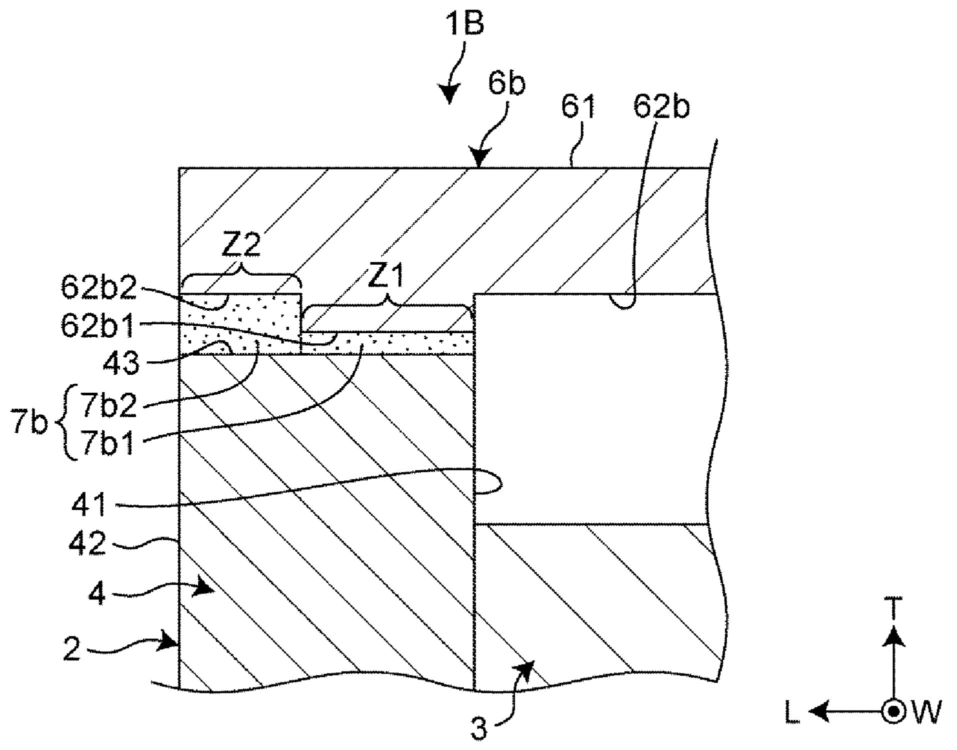
FIG. 6 is a sectional view showing a coil component according to a third embodiment of the present disclosure.

FIG. 6 is a sectional view showing a coil component 1B according to a third embodiment. Here, the wire 15 is omitted in FIG. 6.

The coil component 1B is different from the coil component 1 according to the first embodiment in a structure of a plate member. This point of difference will be described below. Other configurations are the same as those of the first embodiment, and the description may be omitted.

As shown in FIG. 6, a second principal face 62*b* of a plate member 6*b* of the coil component 1B has a flat part 62*b*2 and a protrusion 62*b*1 which is protruded toward the first flange portion 4 more closely than the flat part 62*b*2. Between the plate member 6*b* and the first flange portion 4, a spacing between the protrusion 62*b*1 and the upper face 43 of the first flange portion 4 is narrower than a spacing between the flat part 62*b*2 and the first flange portion 4. That is, a first part Z1 which has a narrow spacing and a second part Z2 which has a spacing wider than the first part Z1 are present in a spacing between the plate member 6*b* and the first flange portion 4. The first part Z1 corresponds to a part between the protrusion 62*b*1 and the upper face 43 of the first flange portion 4, and the second part Z2 corresponds to a part between the flat part 62*b*2 and the upper face 43 of the first flange portion 4.

In other words, an adhesive portion 7*b* has a first part 7*b*1 which has a thin thickness and a second part 7*b*2 which has a thickness larger than the first part 7*b*1. The first part 7*b*1 of the adhesive portion 7*b* is present in the first part Z1, and the second part 7*b*2 of the adhesive portion 7*b* is present in the second part Z2.

According to the embodiment, placement of the first part Z1 causes a distance between the first flange portion 4 and the plate member 6*b* to be closer, and enables lowering magnetic resistance of the coil component 1B. Placement of the second part Z2 causes a distance between the first flange portion 4 and the plate member 6*b* to be larger, enables increasing the amount of the adhesive portion 7*b*, and allows enhancing further adhesiveness between the core 2 and the plate member 6*b*.

Furthermore, in the coil component 1B, the first part Z1 is present closer to the winding core portion 3, that is, closer to the inner face 41 of the first flange portion 4, than the second part Z2, in a section in a plane including a central axis direction of the winding core portion 3 and a direction in which the first flange portion 4 and the plate member 6*b* face each other. Having such form leads to a shorter length of a magnetic path passing through the winding core portion 3, the flange portions, and the plate member 6*b*, and consequently, allowing an inductance value to be larger. The direction in which the first flange portion 4 and the plate member 6*b* face each other is the same as the direction in which the second flange portion and the plate member 6*b* face each other.

The plate member 6*b* of the coil component 1B has a structure in which a site facing the second flange portion is similar to a site facing the first flange portion 4.

Fourth Embodiment

Figure 7:
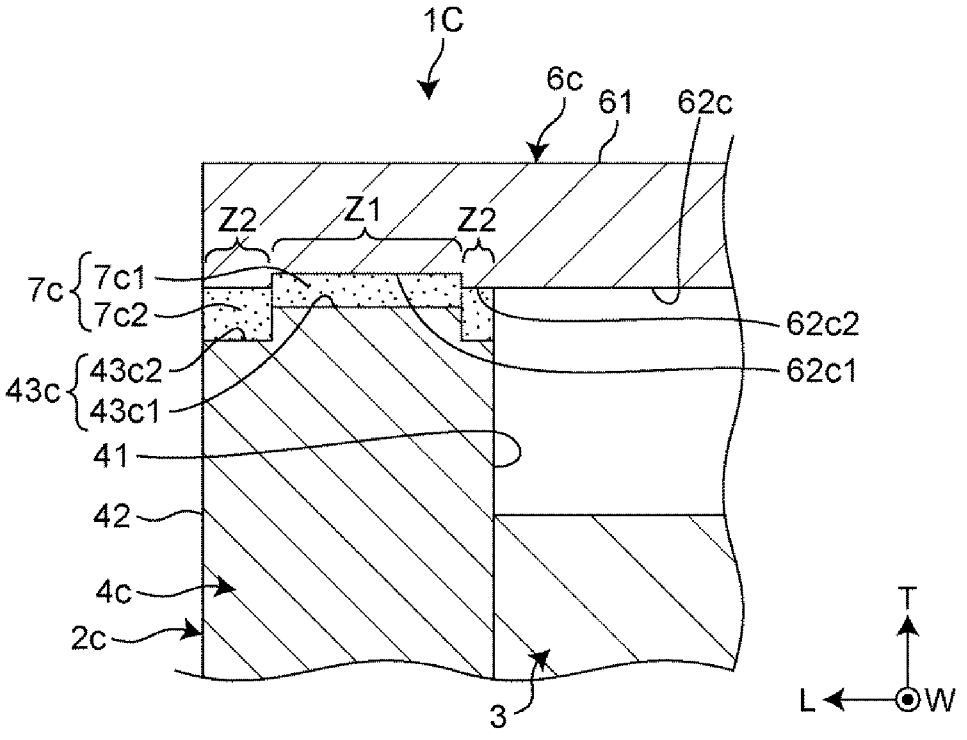
FIG. 7 is a sectional view showing a coil component according to a fourth embodiment of the present disclosure.

FIG. 7 is a sectional view showing a coil component 1C according to a fourth embodiment. Here, the wire 15 is omitted in FIG. 7.

The coil component 1C is different from the coil component 1 according to the first embodiment in structures of a core and a plate member. This point of difference will be described below. Other configurations are the same as those of the first embodiment, and the description may be omitted.

As shown in FIG. 7, in an upper face 43*c*, a first flange portion 4*c* of a core 2*c* of the coil component 1C has a flat part 43*c*2 and a protrusion 43*c*1 which is protruded toward a plate member 6*c* more closely than the flat part 43*c*2. In a second principal face 62*c*, the plate member 6*c* has a flat part 62*c*2 and a cavity 62*c*1 which is more recessed than the flat part 62*c*2 in a direction opposed to the first flange portion 4*c*.

Between the first flange portion 4*c* and the plate member 6*c*, a spacing between the protrusion 43*c*1 of the upper face 43*c* of the first flange portion 4*c* and the cavity 62*c*1 of the second principal face 62*c* of the plate member 6*c* is narrower than a spacing between the flat part 43*c*2 of the first flange portion 4*c* and the flat part 62*c*2 of the second principal face 62*c* of the plate member 6*c*. That is, a first part Z1 which has a narrow spacing and a second part Z2 which has a spacing wider than the first part Z1 are present in a spacing between the first flange portion 4*c* and the plate member 6*c*. The first part Z1 corresponds to a part between the protrusion 43*c*1 of the upper face 43*c* and the cavity 62*c*1 of the second principal face 62*c*, and the second part Z2 corresponds to a part between the flat part 43*c*2 of the upper face 43*c* and the flat part 62*c*2 of the second principal face 62*c*.

In other words, an adhesive portion 7*c* has a first part 7*c*1 which has a thin thickness and a second part 7*c*2 which has a thickness larger than the first part 7*c*1. The first part 7*c*1 of the adhesive portion 7*c* is present in the first part Z1, and the second part 7*c*2 of the adhesive portion 7*c* is present in the second part Z2.

According to the embodiment, placement of the first part Z1 causes a distance between the first flange portion 4*c* and the plate member 6*c* to be closer, and enables lowering magnetic resistance of the coil component 1C. Placement of the second part Z2 causes a distance between the first flange portion 4*c* and the plate member 6*c* to be larger, enables increasing the amount of the adhesive portion 7*c*, and allows enhancing further adhesiveness between the core 2*c* and the plate member 6*c*.

A second flange portion of the coil component 1C has a structure similar to that of the first flange portion 4*c*. The plate member 6*c* has a structure in which a site facing the second flange portion is similar to a site facing the first flange portion 4*c*.

Fifth Embodiment

Figure 8:
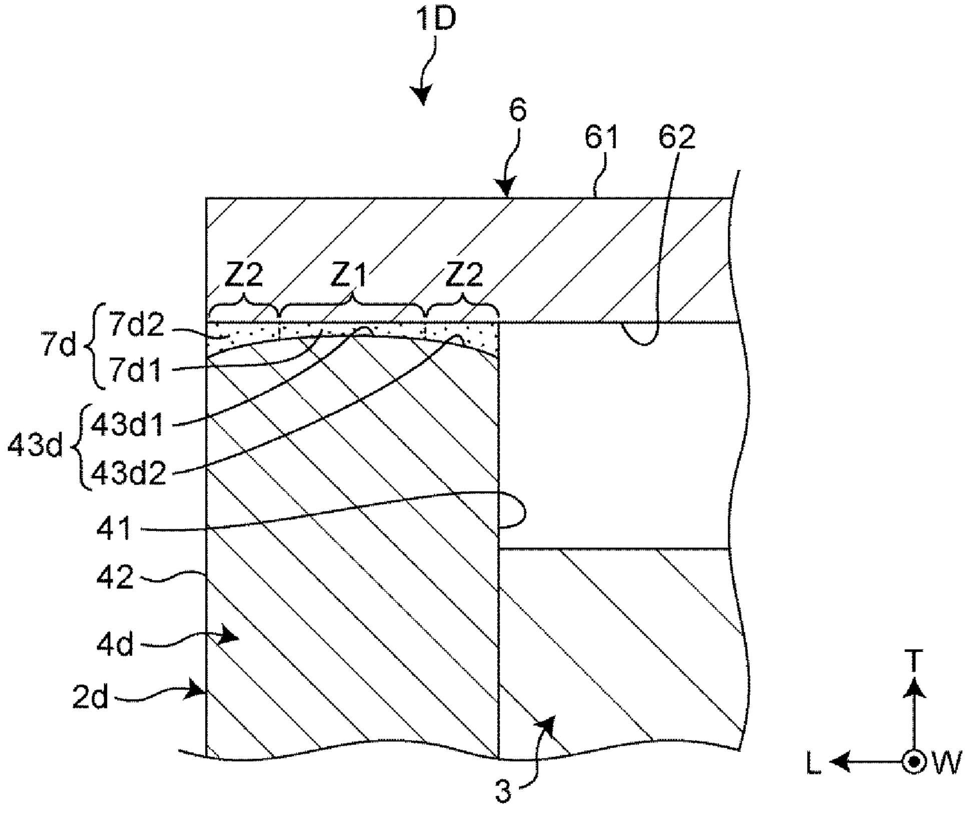
FIG. 8 is a sectional view showing a coil component according to a fifth embodiment of the present disclosure.

FIG. 8 is a sectional view showing a coil component 1D according to a fifth embodiment. Here, the wire 15 is omitted in FIG. 8.

The coil component 1D is different from the coil component 1A according to the second embodiment in a structure of the upper face of a flange portion of a core. This point of difference will be described below. Other configurations are the same as those of the second embodiment, and the description may be omitted.

In the embodiment, an upper face 43*d* of a first flange portion 4*d* of a core 2*d* of the coil component 1D differs from the second embodiment, in which the upper face 43*a* of the core 2*a* has the protrusion 43*a*1 and the flat part 43*a*2, and has a protruded, curved surface protruded toward the plate member 6.

As shown in FIG. 8, the upper face 43*d* of the first flange portion 4*d* has a substantially arc shape in a section including the T direction and the L direction. This represents, in the upper face 43*d* of the first flange portion 4*d*, a substantially arc shape in which the central position in the L direction is closest to the plate member 6. In the inner face 41 and the outer face 42 of the first flange portion 4*d*, the upper face 43*d* is most apart from the plate member 6, and the distance from the inner face 41 to the plate member 6 and the distance from the outer face 42 to the plate member 6 are the same.

Here, the substantially arc shape described above may be a substantially circular arc shape, or may be a substantially elliptic arc shape. In addition, the top of the substantially arc shape need not be in the center of the first flange portion 4*d*. There may be difference between a distance from the plate member 6 to the inner face 41 and a distance from the plate member 6 to the outer face 42.

In the embodiment, a first part Z1 is a region that includes a minimal distance and occupies half of the width of the first flange portion 4*d* with centering the top of the substantially arc shape of the upper face 43*d* of the first flange portion 4*d*, and a second part Z2 refers to a part excluding the first part Z1 and a part including a maximal spacing.

In other words, an adhesive portion 7*d* has a first part 7*d*1 which has a thin thickness and a second part 7*d*2 which has a thickness larger than the first part 7*d*1. The first part 7*d*1 of the adhesive portion 7*d* is present in the first part Z1, and the second part 7*d*2 of the adhesive portion 7*d* is present in the second part Z2.

According to the embodiment, placement of the first part Z1 causes a distance between the first flange portion 4*d* and the plate member 6 to be closer, and enables lowering magnetic resistance of the coil component 1D. Placement of the second part Z2 causes a distance between the first flange portion 4*d* and the plate member 6 to be larger, enables increasing the amount of the adhesive portion 7*d*, and allows enhancing further adhesiveness between the core 2*d* and the plate member 6.

A second flange portion of the coil component 1D has a structure similar to that of the first flange portion 4*d*.

In addition, the present disclosure is not limited to the first embodiment to the fifth embodiment as mentioned above, and is changeable in design without departing from the spirit of the present disclosure.

Each material is not limited to one as exemplified above, and can employ a known one.

No adhesive portion is disposed between a winding core portion of a core and a plate member in the first embodiment to the fifth embodiment, but an adhesive portion may be disposed between a winding core portion of a core and a plate member in another embodiment.

The upper face of a protrusion and the bottom face of a cavity are flat faces in the second embodiment to the fourth embodiment, but may be in a curved shape. A sectional shape of a protrusion may be in a substantially circular shape.

The upper face of a first flange portion and the upper face of a second flange portion of a core have the same shape in the first embodiment to the third embodiment, but may have individually different shapes.

The face facing a first flange portion of a plate member and the face facing a second flange portion of the plate member have the same shape in the first embodiment to the fifth embodiment, but may have individually different shapes.

The number of wires is one in the first embodiment to the fifth embodiment, but may be two or more.

A single terminal electrode is disposed in each flange portion in the first embodiment to the fifth embodiment, but a plurality of terminal electrodes may be disposed in each flange portion.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A coil component comprising:

a core having a winding core portion, a first flange portion disposed on a first end portion of the winding core portion, and a second flange portion disposed on a second end portion of the winding core portion;

a wire winding on the winding core portion of the core;

a plate member disposed so as to bridge the first flange portion and the second flange portion; and an adhesive portion disposed between the first flange portion and the plate member and adhering the first flange portion to the plate member, and an adhesive portion disposed between the second flange portion and the plate member and adhering the second flange portion to the plate member, wherein the adhesive portion contains a resin and magnetic powder, the magnetic powder includes first particles having a particle size in a range of from 0.1 μm to 2.0 μm, and second particles having a particle size in a range of from 3.0 μm to 8.0 μm, a proportion of a particle count of the first particles relative to a total particle count of the magnetic powder is in a range of from 0.11 to 0.80, a proportion of a particle count of the second particles relative to the total particle count of the magnetic powder is in a range of from 0.19 to 0.89, a proportion of a sum of the particle count of the first particles and the particle count of the second particles relative to the total particle count of the magnetic powder is 0.84 or more, and in a section of the adhesive portion, a proportion of an area of the magnetic powder relative to an area of the adhesive portion is 25.0% or more.

2. The coil component according to claim 1, wherein magnetic permeability μ' of the adhesive portion at 1 MHz is 4.6 or more.

3. The coil component according to claim 1, wherein the proportion of the area of the magnetic powder is 35.1% or more.

4. The coil component according to claim 1, wherein the proportion of the sum of the particle count of the first particles and the particle count of the second particles is 0.90 or more.

5. The coil component according to claim 1, wherein a first part having a narrow spacing and a second part having a wider spacing than the first part are present in at least one of a spacing between the first flange portion and the plate member and a spacing between the second flange portion and the plate member.

6. The coil component according to claim 5, wherein the spacing in the first part is in a range of from 1 μm to 10 μm, and the spacing in the second part is in a range of from 5 μm to 20 μm.

7. The coil component according to claim 5, wherein the first particles are present in the first part in an amount greater than in the second part.

8. The coil component according to claim 5, wherein the second particles are present in the second part in an amount greater than in the first part.

9. The coil component according to claim 5, wherein in a section in a plane including a central axis direction of the winding core portion and a direction in which the first flange portion and the plate member face each other, the first part is closer to the winding core portion than the second part.

10. The coil component according to claim 2, wherein the proportion of the area of the magnetic powder is 35.1% or more.

11. The coil component according to claim 2, wherein the proportion of the sum of the particle count of the first particles and the particle count of the second particles is 0.90 or more.

12. The coil component according to claim 3, wherein the proportion of the sum of the particle count of the first particles and the particle count of the second particles is 0.90 or more.

13. The coil component according to claim 2, wherein a first part having a narrow spacing and a second part having a wider spacing than the first part are present in at least one of a spacing between the first flange portion and the plate member and a spacing between the second flange portion and the plate member.

14. The coil component according to claim 3, wherein a first part having a narrow spacing and a second part having a wider spacing than the first part are present in at least one of a spacing between the first flange portion and the plate member and a spacing between the second flange portion and the plate member.

15. The coil component according to claim 4, wherein a first part having a narrow spacing and a second part having a wider spacing than the first part are present in at least one of a spacing between the first flange portion and the plate member and a spacing between the second flange portion and the plate member.

16. The coil component according to claim 6, wherein the first particles are present in the first part in an amount greater than in the second part.

17. The coil component according to claim 6, wherein the second particles are present in the second part in an amount greater than in the first part.

18. The coil component according to claim 7, wherein the second particles are present in the second part in an amount greater than in the first part.

19. The coil component according to claim 6, wherein in a section in a plane including a central axis direction of the winding core portion and a direction in which the first flange portion and the plate member face each other, the first part is closer to the winding core portion than the second part.

20. The coil component according to claim 7, wherein in a section in a plane including a central axis direction of the winding core portion and a direction in which the first flange portion and the plate member face each other, the first part is closer to the winding core portion than the second part.

* * * * *